United States Patent [19]
Manning

[11] 3,888,853
[45] June 10, 1975

[54] 1,2,5,6-TETRAHYDROPYRIDINES
[75] Inventor: Robert E. Manning, Mountain Lakes, N.J.
[73] Assignee: Sandoz, Inc., E. Hanover, N.J.
[22] Filed: Sept. 19, 1973
[21] Appl. No.: 398,582

Related U.S. Application Data
[63] Continuation of Ser. No. 194,687, Nov. 1, 1971, abandoned.

[52] U.S. Cl. .......................... 260/247.1 M; 424/248
[51] Int. Cl............................................. C07d 87/46
[58] Field of Search ............................. 260/247.1 M

[56] References Cited
UNITED STATES PATENTS
3,726,868    4/1973    Manning et al. ............. 260/247.1 R FOREIGN PATENTS OR APPLICATIONS
1,211,691    3/1960    France ........................ 260/247.1 M Primary Examiner—Lorraine A. Weinberger
Assistant Examiner—Michael Shippen
Attorney, Agent, or Firm—Gerald D. Sharkin; Robert S. Honor; Thomas O. McGovern

[57] ABSTRACT

Disubstituted 1,2,5,6-tetrahydropyridines, e.g., 1,2,5,-6-tetrahydro-1-methyl-4-(2-morpholino-1-phenylsulfonylethyl)-pyridine, are prepared by reducing disubstituted 1,4-dihydropyridine with alkali metal hydrides and are useful as antihypertensives.

2 Claims, No Drawings

1,2,5,6-TETRAHYDROPYRIDINES

This is a continuation of application Ser. No. 194,687, filed Nov. 1, 1971 now abandoned.

This invention relates to 1,4-disubstituted derivatives of 1,2,5,6-tetrahydropyridine. In particular, this invention relates to 1,2,5,6-tetrahydro-1-lower alkyl -4-(2-morpholino-1-arylsulfonylethyl)-pyridines, intermediates used in their preparation and their use in pharmaceutical compositions.

The compounds of this invention may be represented by the following structural formula:

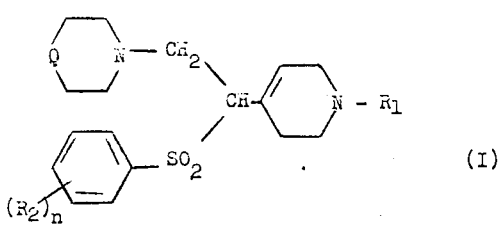

where
$n$ is 0, 1 or 2;
$R_1$ is lower alkyl, i.e., alkyl having 1 to 4 carbon atoms, e.g., methyl, ethyl, isopropyl and the like and
$R_2$ is halo having an atomic weight of about 19 to 36, lower alkyl as defined above or lower alkoxy, i.e., alkoxy having 1 to 4 carbon atoms, e.g., methoxy, ethoxy, isopropoxy, etc, and pharmaceutically acceptable acid addition salts thereof.

The compounds of formula (I) are prepared according to the following reaction scheme:

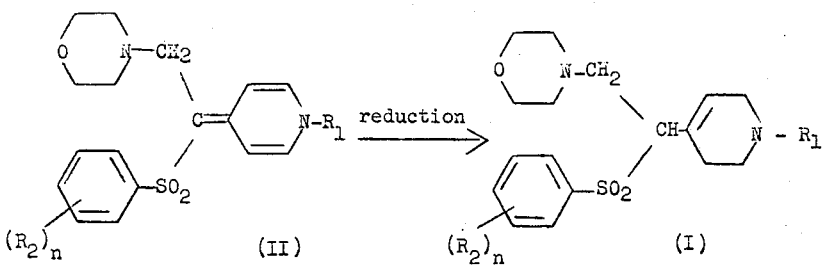

where $n$, $R_1$ and $R_2$ are as defined above.

The compounds of formula (II) are reduced to the corresponding compounds of formula (I) with an alkali metal borohydride reducing agent in a suitable inert solvent. The alkali metal borohydride reducing agents which can be used include sodium, lithium or potassium borohydride, preferably sodium borohydride. Although the reaction temperature is not critical, the reduction is conveniently carried out at temperatures between about 0° to 80°C., preferably between 20°–40°C. Suitable inert solvents are preferably metallic hydride solublizing solvents such as water, lower alkanols, such as methanol or ethanol, or mixtures of water and lower alcohols, although the particular solvent used is not critical. For optimum results, the reaction should be run for about ½ to 4 hours, preferably 1 to 2 hours. The resulting product (I) is recovered by conventional techniques, e.g. extraction and evaporation.

The compounds of formula (II) are prepared in accordance with the following reaction scheme:

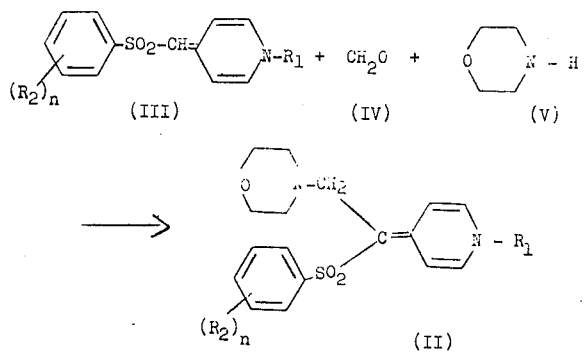

where

The compounds of formula (II) are prepared by treating a compound of formula (III) with morpholine (V) in the presence of paraformaldehyde (IV). Although a solvent is not necessary, the reaction is preferably carried out using a lower alkanol such as methanol, ethanol and the like, or ethers, such as tetrahydrofuran, diethyl ether and the like, as solvents or if desired an excess of the compound of formula (V). The temperature at which the reaction is run is not critical, but it is preferred that the process be carried out at temperatures between about 10° to 80°C., especially between 20° to 40°C. The time of the reaction is not critical, although for optimum results, it should be run for 2 to 20 hours preferably 5 to 15 hours. The final product (II) is recovered by conventional techniques, e.g. filtration and recyrstallization.

The compounds of formula (IV) and (V) and many of the compounds of formula (III) are known and can be prepared by methods disclosed in the literature. The compounds of formula (III) not specifically disclosed in the literature can be prepared by analogous methods from known starting materials.

The compounds of formula (I) are useful because they possess pharmacological activity in animals. In particular, the compounds are useful as hypotensive/anti-hypertensive agents, as indicated by their activity in renal hypertensive rats given 100 mg/kg of active compound using the techniques of A. Grollman (Proc. Soc. Exptl. Biol. and Med. 57:102, 1944) and indirectly measuring the blood pressure from the caudal artery in the tail using a pneumatic pulse transducer.

When so utilized, the compounds may be combined with one or more pharmaceutically acceptable carrier or adjuvants. They may be administered orally or parenterally; and depending upon the compound employed and the mode of administration the exact dosage utilized may vary.

Furthermore, the compounds of formula (I) may be similarly administered in the form of their non-toxic pharmaceutically acceptable acid addition salts. Such salts possess the same order of activity as the free base, are readily prepared by reacting the base with an appropriate acid and, accordingly, are included within the scope of the invention. Representative of the acid addition salts are the mineral acid salts, such as the hydrochloride, hydrobromide, sulfate, phosphate and the like and the organic acid salts, such as the succinate, benzoate, acetate, p-toluenesulfonate, benzenesulfonate, and the like.

In general, satisfactory results are obtained when these compounds are administered as a hypotensive/anti-hypertensive agent at a daily dosage of about 0.5 milligrams to about 100 milligrams per kilogram of animal body weight p.o. This daily dosage is preferably administered 2 to 4 times a day, or in sustained release form. For most large mammals, such as primates, the total daily dosage is from about 35 milligrams to about 750 milligrams. Dosage forms suitable for internal use comprise from about 8.75 milligrams to about 375 milligrams of the active compound in intimate admixture with a solid or liquid pharmaceutically acceptable carrier or diluent.

A representative formulation suitable for oral administration is a tablet or capsule prepared by standard encapsulating techniques which contain the ingredients indicated below and are useful in treating hypertension at a dose of one tablet or capsule 2 to 4 times a day.

| Ingredient | Weight (mg) | |
|---|---|---|
| | tablet | capsule |
| 1,2,5,6,-tetrahydro-1-methyl-4-(2-morpholino-1-phenyl-sulfonylethyl)-pyridine | 25 | 25 |
| tragacanth | 10 | — |
| lactose | 222.5 | 275 |
| corn starch | 25 | — |
| talcum | 15 | — |
| magnesium stearate | 2.5 | — |
| Total | 300 mg. | 300 mg. |

The following pharmaceutical compositions are formulated with the indicated amount of active agent using conventional techniques. The injectable suspension and the oral liquid suspension represent formulations useful as unit doses and may be administered in the treatment of hypertension. The injectable suspension is suitable for administration once a day whereas the oral liquid suspension is suitably administered 2 to 4 times per day for this purpose.

EXAMPLE 1

1,2,5,6-Tetrahydro-1-methyl-4-(2-morpholino-1-phenylsulfonylethyl)-pyridine

Step A: 1,4-dihydro-1-methyl-4-(2-morpholino-1-phenylsulfonylethyl)-pyridine.

A mixture of 18 grams of 1,4-dihydro-1-methyl-4-phenylsulfonylmethylenepyridine, 13.3 grams of paraformaldehyde and 18.4 grams of morpholine in 107 milliliters of ethanol is stirred at room temperature for 17 hours. The resultant solid is collected by filtration and washed with ethanol. Recrystallization from methanol yields 1,4-dihydro-1-methyl-4-(2-morpholino-1-phenylsulfonylethyl)-pyridine (m.p. 195°C, decomposition).

When the above procedure is carried out using an equivalent amount of 1,4-dihydro-1-methyl-4-(p-chlorophenylsulfonylmethylene)pyridine; 1,4-dihydro-1-methyl-4-(p-tolylsulfonylmethylene)-pyridine or 1,4-dihydro-1-methyl-4-(p-methoxyphenylsulfonylmethylene)-pyridine in place of the 1,4-dihydro-1-methyl-4-phenylsulfonylmethylenepyridine used therein there is obtained 1,4-dihydro-1-methyl-4-(2-morpholino-1-[p-chlorophenylsulfonyl]-ethyl)-pyridine; 1,4-dihydro-1-methyl-4-(2-morpholino-1-[p-tolylsulfonyl]-ethyl)-pyridine or 1,4-dihydro-1-methyl-4-(2-morpholino-1-[p-methoxyphenylsulfonyl]-ethyl)-pyridine respectively.

Step B: 1,2,5,6-tetrahydro-1-methyl-4-(2-morpholino-1-phenylsulfonylethyl)-pyridine To a stirred mixture of 14.8 grams of 1,4-dihydro-1-methyl-4-(2-morpholino-1-phenylsulfonylethyl)-pyridine in 300 milliliters of methanol at room temperature is added 7 grams of sodium borohydride in small portions. After addition is completed, stirring is continued for an additional 4 hours. The reaction mixture is evaporated in vacuo and the residue is taken up in ether and water. The ether layer is separated and dried with sodium sulfate. The solvent is then evaporated to crystallize out the product, 1,2,5,6-tetahydro-1-methyl-4-(2-morpholino-1-phenylsulfonylethyl)-pyridine(m.p. 110°–112°C).

| Ingredients | Weight (mg) | |
|---|---|---|
| | sterile injectable suspension | oral liquid suspension |
| 1,2,5,6-tetrahydro-1-methyl-4-(2-mopholino-3-phenylsulfonyl-ethyl)-pyridine | 25 | 25 |
| sodium carboxy methyl cellulose U.S.P. | 1.25 | 12.5 |
| methyl cellulose | 0.4 | — |
| polyvinylpyrrolidone | 5 | — |
| lecithin | 3 | — |
| benzyl alcohol | 0.01 | — |
| magnesium aluminum silicate | — | 47.5 |
| flavor | — | q.s. |
| color | — | q.s. |
| methyl paraben, U.S.P. | — | 4.5 |
| propyl paraben, USP | — | 1.0 |
| polysorbate 80 (e.g. Tween 80), U.S.P. | — | 5 |
| sorbitol solution, 70% U.S.P. | — | 2,500 |
| buffer agent to adjust pH for desired stability | q.s. | q.s. |
| water | q.s. for injection q.s. to 1 ml. | q.s. to 5 ml. |

Following the above procedure, but using an equivalent amount of 1,4,-dihydro-1-methyl-4-(2-morpholino-1-[p-chlorophenylsulfonyl]-ethyl)-pyridine; 1,4-dihydro-1-methyl-4-(2-morpholino-1-[p-tolylsulfonyl[-ethyl)-pyridine, or 1,4-dihydro-1-methyl-4-(2-morpholino-1-[p-methoxyphenylsufonyl]-ethyl)-pyridine in place of the 1,4-dihydro-1-methyl-4-(2-morpholino-1-phenylsulfonylethyl)-pyridine used therein, there is obtained 1,2,5,6-tetrahydro-1-methyl-4-(2-morpholino-1-[p-chlorophenylsulfonyl]-ethyl)-pyridine; 1,2,5,6-tetrahydro-1-methyl-4-(2-morpholino-1[p-tolylsulfonyl]-ethyl)-pyridine or 1,2,5,6-tetrahydro-1-methyl-4-(2-morpholino-1-[p-methoxyphenylsulfonyl]-ethyl)-pyridine respectively.

The above 1,2,5,6-tetrahydro-1-methyl-4-(2-morpholino-1-phenylsulfonylethyl)-pyridine is dissolved in anhydrous methanol at room temperature. Hydrogen chloride gas is bubbled through the solution for about one-half hour. The hydroscopic dihydrochloride salt obtained is separated by filtration and is dried and stored under anhydrous conditions.

What is claimed is:

1. A compound of the formula

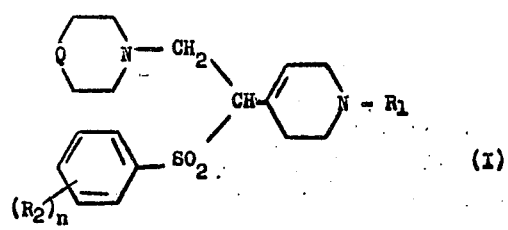

where
   $n$ is 0, 1 or 2
   $R_1$ is lower alkyl and
   $R_2$ is halo having an atomic weight of about 19 to 36, lower alkyl or lower alkoxy or
a pharmaceutically acceptable acid addition salt thereof.

2. The compound of claim 1 which is 1,2,5,6-tetrahydro-1-methyl-4-(2-morpholino-1-phenylsulfonylethyl)-pyridine.

* * * * *